UNITED STATES PATENT OFFICE.

MAX HARTMANN AND ERNST WYBERT, OF BASEL, SWITZERLAND, ASSIGNORS TO SOCIETY OF CHEMICAL INDUSTRY IN BASLE, OF BASEL, SWITZERLAND.

THIENYLQUINOLIN CARBOXYLIC ACIDS.

1,350,408.  Specification of Letters Patent.  Patented Aug. 24, 1920.

No Drawing.  Application filed October 21, 1918.  Serial No. 258,957.

*To all whom it may concern:*

Be it known that we, MAX HARTMANN and ERNST WYBERT, both citizens of the Republic of Switzerland, and residents of Basel, Switzerland, chemists, have invented new and useful Thienylquinolin-Carboxylic Acids, of which the following is a clear, full, and exact specification.

We have found that the acetothienone which can be obtained from thiophene and acetylchlorid according to the reaction of Friedel-Craft can be condensed under the action of convenient condensing agents with isatin to 2-thienylquinolin-4-carboxylic acid. In the same way other isatin compounds, as for instance, derivatives and products of substitution of isatin can be condensed with acetothienone to correspondingly substituted thienylquinolin-carboxylic acids. As condensing agents, there can be employed for example alcoholic or aqueous alkalis or earth-alkalis. The obtained acids themselves can be converted, according to known methods, into their desired derivatives, as for instance salts, esters, amids, etc.

The 2-thienylquinolin-4-carboxylic acid corresponds to the following formula:

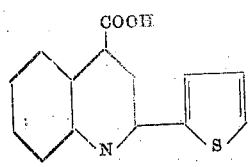

It resembles consequently with respect to its constitution 2-phenylquinolin-4-carboxylic acid, the well known antiarthritic substance. The entrance of the thiophene-radical in lieu of the phenyl-group causes, however, an important change of the physiological effect. The most striking property is an extraordinarily pronounced formation of coloring matter in the body. If, by way of experiment, only small quantities of the non-poisonous 2-thienylquinolin-4-carboxylic acid are administered to an animal, there occurs immediately an intensive violet coloration extended on all parts of the animal body. Besides the urine shows the color of a concentrated solution of potassium permanganate. On dissecting it is found that the nerves remain entirely free from the coloration. The coloring matter which can be eliminated from the urine in form of intensively violet colored crystals dissolves difficultly in water and dilute acid, easily in alkalis forming deeply colored alkali salts, somewhat easily in cold alcohol and difficultly in ether, while it is insoluble in benzene and toluene.

The 2-thienylquinolin-4-carboxylic acids and their derivatives serve for histological and therapeutical purposes. The 2-thienylquinolin-4-carboxylic acid is particularly employed for vital coloration. It possesses the property of selective coloration of the tissues. It colors intensely for instance the fasciæ, the sinews, the tendons and the cartilages, but does not color the skeleton muscles, the interior of the milt, the pancreas, the supra-renal gland, the brain and the nerves. It colors the tissues of the human body as intensively as those of the animal body. A single administration of about 0.5 gr. per each kg. of the body weight is sufficient for producing a violet coloration remaining for months. The therapeutical action of the 2-thienylquinolin-4-carboxylic acid is analogous to that of the 2-phenylquinolin-4-carboxylic acid, that is to say it acts as a solvent of uric acid. It is relatively non-poisonous.

*Example 1.*

80 gr. of 2-acetothienone, 88 gr. of isatin, 470 c. c. of potash-lye of 28 per cent. and 70 c. c. of alcohol are heated, while stirring, during 3 hours, on the water bath. After cooling, the 2-thienylquinolin-4-carboxylic acid is precipated by acetic acid and recrystallized from alcohol. It forms small yellow leaves of the fusion point 211°. It is difficultly soluble in water, dissolves somewhat easily in hot alcohol; it is soluble in sodium carbonate and soda-lye. It can be precipitated from alkaline solutions by means of dilute acids. It is also soluble in an excess of strong acids.

*Example 2.*

22 parts of acetothienone are dissolved in 20 parts of alcohol and the resulting solution is heated to boiling in an apparatus provided with a reflux condenser, for 3 hours, with 6 parts of sodium dibromisatinate and 120 parts of soda lye of 28 per cent. After cooling, the sodium salt of the 2-thienyl-6.8-dibromquinolin-4-carboxylic acid separates in large bright leaves which are recrystallized from hot water. From the sodium salt there can be separated the free acid by acetic acid or a dilute mineral acid. It crystallizes from alcohol or glacial acetic acid.

What we claim is:

1. As new products the herein described 2-thienylquinolin-4-carboxylic acids, obtained by condensing isatin compounds with acetothienone, which constitute well crystallized compounds of determined fusion point, are easily soluble in most of the organic solvents and in strong mineral acids and serve for histological and therapeutical purposes.

2. As a new article of manufacture, the 2-thienylquinolin-4-carboxylic acid derived from isatin and acetothienone, which crystallizes in form of small yellow leaves of the fusion point 211°; dissolves difficultly in water, somewhat easily in hot alcohol, is soluble in sodium carbonate and soda lye as well as in an excess of strong acids, is precipitated from its alkaline solutions by dilute acids and produces, when injected into the animal body, a violet coloring matter which dissloves difficultly in water and dilute acid, easily in alkalis, somewhat easily in cold alcohol, difficultly in ether, but is insoluble in benzene and toluene.

In witness whereof we have hereunto signed our names this 9th day of September, 1918, in the presence of two subscribing witnesses.

MAX HARTMANN.
ERNST WYBERT.

Witnesses:
H. H. WERTH,
AMAND RITTER.